Nov. 17, 1925. 1,562,334
A. C. JONES ET AL
ANIMAL TRAP
Filed Nov. 13, 1923
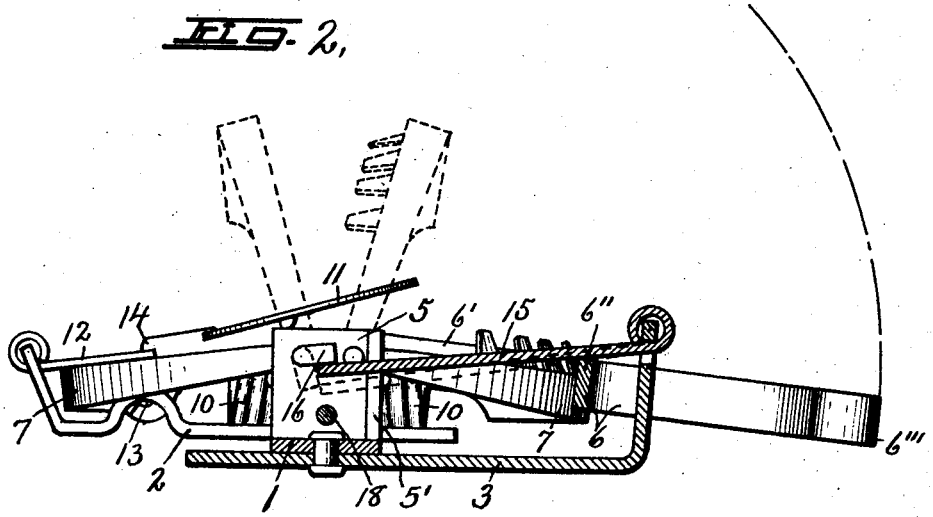
INVENTOR
A. C. Jones 2nd
BY J. O'nril
Howard P. Denison
ATTORNEY Patented Nov. 17, 1925.

1,562,334

UNITED STATES PATENT OFFICE.

ALLAN C. JONES AND JEREMIAH O'NEIL, OF ONEIDA, NEW YORK, ASSIGNORS, BY MESNE ASSIGNMENTS, TO ANIMAL TRAP COMPANY OF AMERICA, OF LITITZ, PENNSYLVANIA, A CORPORATION OF PENNSYLVANIA.

ANIMAL TRAP.

Application filed November 13, 1923. Serial No. 674,452.

*To all whom it may concern:*

Be it known that we, ALLAN C. JONES and JEREMIAH O'NEIL, citizens of the United States of America, of Oneida, in the county of Madison, in the State of New York, have invented new and useful Improvements in Animal Traps, of which the following, taken in connection with the accompanying drawings, is a full, clear, and exact description.
This invention relates to an animal trap in which a spring-actuated striker-bar is hinged to the trap-frame to swing about an axis parallel with the axes of movement of the trap jaws from a set position at one side to a sprung position at the opposite side of the jaws beyond and below the level of the trap frame and parts carried thereby so as to forcibly slam the body of the animal against the ground rather than against any portion of the frame or trap when caught and held by the jaws.

The main object is to cause the striker-bar to hit the animal with sufficient freedom and force as to render it insensible instantly up-on its being trapped and at the same time to reduce the liability of throwing the animal from the trap by the action of the striker-bar.

Another object is to enable the trap jaws to be set and operated independently of the striker-bar when desired, as for example in trapping relatively small animals.

Other objects and uses relating to specific parts of the invention will be brought out in the following description.

In the drawings:—

Figure 1 is a top plan of an animal trap embodying the various features of my invention, the jaws of the trap and the striker-bar being shown in their set positions against the action of their respective operating springs, the sprung position of the striker-bar being indicated by dotted lines.

Figure 2 is an enlarged transverse vertical sectional view taken on line 2—2, Figure 1.

As illustrated this trap comprises a main supporting frame consisting of a lengthwise bar —1— and cross bars —2— and —3—, all of which are preferably made of sheet metal, the bar —1— being provided with opposite upturned end lugs —4— and a pair of intermediate upwardly projecting lugs or ears —5— in longitudinally spaced relation for receiving and supporting a striker- bar —6— and a pair of trap jaws —7— respectively.

The jaws —7— extend lengthwise of the bar —1— and are provided at their ends with outturned pintles journaled in suitable bearings in the lugs —5— for swinging movement about parallel axes lengthwise of the bar —1—.

A jaw-operating spring —8— consisting of a single piece of spring wire has its intermediate portion bent in the form of a loop —9— for engaging the opposite edges of one end of the jaws —7—, the opposite ends of said wire-spring being bent in the form of coils —10— adjacent one of the lugs —4— with the bar —1— and inserted in the suitable apertures in said lug to hold the spring in operative position against lateral or upward displacement.

The loop —9— is formed by crossing the opposite sides of the wire between the adjacent ends of the jaws —7— and the coil —10— as shown more clearly in Figure 1, the opening in the loop being of sufficient width to permit the latter to be depressed below the adjacent end pintles and around the corresponding lug —5— to allow the jaws —7— to be opened.

Suitable means is provided for releasably holding the jaws in set or open positions consisting in this instance, of a bait-pan —11— and a detent —12—, the bait-pan being pivoted at —13— to the cross bar —2— at one side of the main bar —1— while the detent —12— is pivoted to an extension of the bar —2— to swing into and out of engagement with the heel —14— of the bait-pan, and to and from a position across the upper face of the central portion of the adjacent jaw —7— as shown in Figure 2.

When the jaws —7— are fully opened, the detent —12— is adjusted by hand across the upper edge of the adjacent jaw —7— and interlocked with the heel —14— of the bait pan —11— thereby holding both jaws open against the action of the spring —8—.

On the other hand, a slight downward pressure upon the bait pan —11— as for example, by the engagement of the foot of an animal therewith, will release the detent —12— and allow the jaws to be closed upon the leg of the animal by the action of the spring —8—, it being understood that the portions of the jaws engaged by the spring are flared upwardly from their adjacent end pintles to a width slightly greater than that of the opening in the loop —9— for assisting and limiting the jaw-closing movement of the spring.

The striker-bar —6— also extends lengthwise of the frame bar —1— some distance beyond opposite ends of the trap jaws —7— and has its opposite ends provided with suitable outturned pintles journaled in suitable bearings in the end lugs —4— of the frame bar —1— to enable the striker bar to swing about an axis parallel with the axes of movement of the trap jaws —7—.

The intermediate portion of the striker-bar —6— is arched outwardly some distance beyond the path of movement of the trap jaws —7— and also beyond the opposite ends of the cross bar —2— which is therefore, of less transverse length than the radius of the arc of movement of the central portion of the striker-bar. Therefore, when the striker-bar is sprung, it will as shown by dotted lines in Figure 1, swing over the jaws —7— and beyond the trap frame without engaging the latter or any parts carried thereby. The length of the striker-bar exclusive of its pintles is substantially equal to the distance between the upstanding lugs —4— of the frame bar —1— and the opposite arms —6— of the striker-bar adjacent the lugs —4— are disposed in planes at substantially right angles to the axis of movement, while the portions —6''— between the arms —6'— and ends of the arch as —6'''— are disposed in planes substantially parallel with the axis of movement of the striker bar and therefore, parallel with the frame bar —1—.

The cross-bars —2— and —3— are rigidly secured by rivets or otherwise, to the upper and lower sides, respectively, of the bar —1— in longitudinally spaced relation, the cross-bar —3— being located adjacent the outer face of the lug —5— opposite the jaw-operating spring —8— and extended laterally in a direction opposite the direction of extension of the bar —2— slightly beyond the arc of movement of the adjacent portion —6''— of the striker bar —6—.

The outer end of the cross-bar —3— is bent upwardly to form a lug to which is pivoted one end of a detent —15— adapted to swing about an axis parallel with that of the jaws —7— with sufficient clearance to allow a limited lateral movement thereof for a purpose presently described.

The pintle of one of the jaws —7— nearest the detent —12— is extended a short distance beyond the adjacent pintle of the other jaw and is provided with a lateral offset or keeper —16— adapted to be engaged by the free end of the detent —15— when the jaws —7— and striker-bar —6— are set in their open positions at which time the detent —15— may be adjusted to a position across the upper edge of the striker-bar —6— and engaged with the underside of the extension —16— to hold the striker-bar —6— in its open position.

The striker bar —6— is actuated by a separate coil spring —17— extending lengthwise of and in close proximity to the upper face of the frame bar —1— at the ends of the jaws —7— opposite that engaged by the spring —8— and between the adjacent lugs —4— and —5—, said spring having its inner end engaged in an aperture in the frame bar —1— and its outer end offset laterally and engaged with the adjacent arm —6'— of the striker bar —6— for forcibly operating said striker bar from a set position at one side to a sprung position at the opposite side of the trap jaws —7— when the latter are released from their set positions by the tripping of the bait-pan —11—.

A supporting pin —18— is extended lengthwise through the spring coil —17— and has its ends suitably secured in apertures in the adjacent lugs —4— and —5— to assist in holding said spring in operative position, one end of the pin being provided with an eye —19— for receiving a suitable chain —20— by which the trap may be attached to any suitable anchorage not necessary to herein illustrate or describe. The lug —5— adjacent the detent —15— is provided with an offset portion —5'— forming a stop for limiting the movement of the detent —15— toward the jaws and thereby to assure the registration of the free end of the detent with the keeper —16— when setting the striker bar —6— after the jaws —7— have been set, said limiting stop —5'— also serving as a guide for the detent to keep the latter out of engagement with the jaws when the jaws and striker bar are released by the tripping of the detent.

*Operation.*

In setting the trap, the free end of the spring —8— is first depressed below the adjacent pintles of the jaws —7— after which the jaws are opened by hand and locked in their open positions by the adjustment of the detent —12— across the upper edge of the adjacent jaw —7— and the adjustment of the bait pan —11— so as to engage its heel —14— with the free end of the detent.

This setting of the trap jaws —7— may be accomplished independently of the setting of the striker bar —6— which may or may not be used in connection with the trap, but when it is desired to use the striker-bar it may be swung against the action of its operating spring —17— from its sprung position at one side of the jaws —7— to a position at the opposite side of said jaws whereupon its detent —15— may be adjusted across the upper edge thereof and engaged with the underside of the extension —16— at one side of the adjacent pintle opposite the main body of the corresponding jaw, this adjustment being permitted when the jaws —7— are set by reason of the limited lateral movement of the detent —15—.

It is now evident that when the jaws —7— and striker-bar —6— are set in their open positions in the manner described, the action of the striker-bar by its coil spring —17— will be dependent upon the release of the jaws —7— and will not take place until after the jaws have been moved toward their closed positions a sufficient distance to disengage the extension —16— from the free end of the detent —15—.

In other words, assuming that the jaws —7— and striker-bar —6— have been set to their open positions and the bait pan —11— has been depressed by the pressure of the foot of an animal sufficiently to release the heel —14— from engagement with the detent —12—, then the spring —8— will first act upon the jaws —7— to force them to their closed positions during which the extension —16— on one of the jaws —7— will disengage from the detent —15— thereby allowing the spring —17— to swing the striker-bar —6— from its set position at one side of the trap-jaws to its sprung position at the opposite side of the jaws with the central portion or the arch of the striker bar below the plane of the frame, striking the animal with sufficient force as to render it insensible and to impinge the body of the animal against the ground while it is trapped in the closed jaws —7—.

The construction shown and described is particularly simple and efficient in accomplishing the desired end in that the trap-jaws —7— may be set and used for trapping purposes independently of and without in any way interfering with the striker-bar and its operating and holding means, or when setting the trap for larger animals, the striker-bar may easily and quickly be adjusted for use in striking the animal and impinging it against the ground with sufficient force to render it insensible immediately following the closing of the jaws upon the leg of such animal, all of which reduces the liability of displacing the trapped animal from the jaws and also prevents excessive mutilation of the pelts as distinguished from the use of an extra set of jaws operating in conjunction with a pair of primary jaws.

It is evident, however, that various changes may be made in the detail construction of the various parts of the device without departing from the spirit of the invention.

We claim:—

An animal trap comprising a frame, co-operative jaws pivoted to the frame, a spring for closing the jaws, releasable means for holding the jaws open against the action of the spring, a striker-bar pivotally mounted on the frame on an axis parallel to the axes of the jaws so as to swing in opposite directions from a depressed position on one side to a like position on the other side of the jaws, a spring acting independently of the first named spring for moving the striker-bar in one direction, and means controlled by one of the jaws for holding the striker-bar against the action of its spring when the jaws are held open, said striker-bar being of such shape and dimensions relatively to the jaws and the frame as to swing over the jaws and beyond and without engaging the frame or parts carried thereby.

In witness whereof we have hereunto set our hands this 9th day of November, 1923.

ALLAN C. JONES.
JEREMIAH O'NEIL.